Patented Nov. 1, 1949

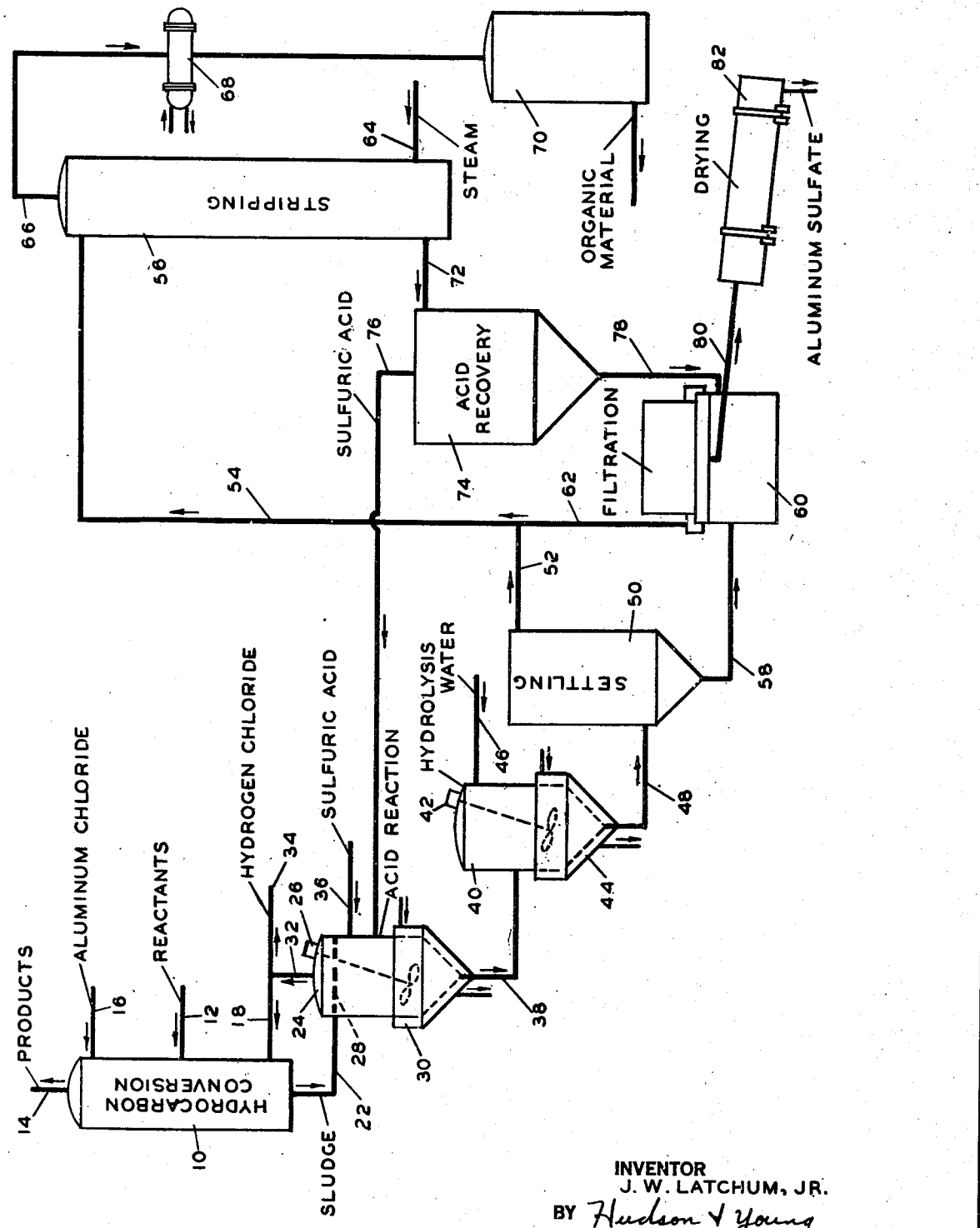

2,486,485

UNITED STATES PATENT OFFICE 2,486,485

UTILIZATION OF METAL HALIDE-HYDROCARBON SLUDGE

John W. Latchum, Jr., Bartlesville, Okla., assignor to Phillips Petroleum Company, a corporation of Delaware Application September 8, 1944, Serial No. 553,222

11 Claims. (Cl. 23—154)

1

This invention relates to the treatment of metal halide sludges. The invention also relates to the production of commercially valuable products from metal halides. In a specific embodiment of this invention waste material from the treatment of hydrocarbons with aluminum chloride, known as aluminum chloride sludge, is reacted with a relatively non-volatile strong mineral acid to form the aluminum salt of the acid, the mixture hydrolized to produce additional valuable materials, and the desirable components from the resulting mixture is separated in a novel manner to recover valuable materials therefrom.

This patent application is a continuation-in-part of my copending patent application, Serial No. 516,318, filed December 30, 1943. The parent application discloses treatment of metal halide sludge with a strong mineral acid to produce hydrogen halide and the salt of the metal and acid. The present invention provides novel methods of further treating the resulting mixture to prepare and separate valuable materials therefrom.

Metal halide catalysts are used in a variety of ways for treatment of hydrocarbons. Among the most important processes at present which employ metal halide catalysts are alkylation and isomerization. These reactions are known to be catalyzed by the so-called Freidel-Crafts type metal halide catalysts, among the better known of which may be mentioned aluminum chloride, aluminum bromide, boron fluoride, zinc chloride, ferric chloride, antimony trifluoride, zirconium tetrachloride and other polyvalent metal halides, generally in anhydrous form. Aluminum chloride is at present most widely used due to its activity, relatively low cost and availability. Metal halide catalysts are also employed in other reactions of hydrocarbons and other organic materials, as is known in the art.

In most cases the metal halide catalysts, as exemplified by aluminum chloride, are advantageously, and sometimes necessarily, activated with the corresponding anhydrous hydrogen halide or with other materials which provide the hydrogen halide under the conditions of reaction. The quantity of hydrogen halide required varies greatly in accordance with the reaction being catalyzed and may range from less than one per cent of the metal halide up to much larger quantities, such as 50 to 100 per cent.

In organic reactions utilizing anhydrous aluminum chloride or the like, the aluminum chloride may be charged to the process either as a solid, or as a slurry formed by dissolving and/or suspending a considerable amount of aluminum

2 chloride in hydrocarbons or other suitable liquids. In any case a liquid sludge is formed after a short period of operation, the rate being more rapid when reactants are in liquid phase, and the sludge, which at the outset is active as a catalyst, gradually becomes deactivated with use. Such sludges may comprise complexes of aluminum chloride with hydrocarbons or other organic materials, as well as dissolved or suspended free aluminum chloride. In a process in which a sludge-forming catalyst is utilized a portion of the sludge must be periodically or continuously withdrawn and replaced with fresh aluminum chloride in order to maintain an economic level of catalytic activity. The utilization of such sludge to avoid wasting its aluminum chloride content would be of appreciable economic advantage and would also simplify the problems of sludge disposal. However, in spite of the obvious need for recovering such aluminum chloride, it has heretofore been customary to discard the sludge as waste material. Although a number of processes have been proposed for utilizing partially spent catalyst to effect further reactions or to recover valuable components, various drawbacks have prevented such processes from being brought into commercially active use.

An object of this invention is to provide a process for the production and recovery of valuable materials from metal halide sludge. Another object of this invention is to provide a process for the separation and purification of reaction products of a strong mineral and a metal halide. Another object of this invention is to provide a process for recovery of organic constituents from metal halide sludge. Other objects and advantages will be apparent from the accompanying disclosure and description.

In accordance with the present invention, metal halide sludge formed as the result of a hydrocarbon reaction is treated with a strong mineral acid, such as sulfuric acid or an oxygen containing acid of phosphorus. Substantially pure anhydrous hydrogen halide is liberated by the reaction. This hydrogen halide is suitable for use as a promotor in the hydrocarbon conversion process, or for reaction with metal to form fresh metal halide catalyst for the process. The reaction products are then hydrolized, stripped of organic components, and the residual material processed for the recovery of the metal salt.

The process will be more readily understood from a detailed description of a specific embodiment of the invention. Since aluminum chloride is most widely used as catalyst, the process will be described with reference to treatment of the aluminum chloride sludge. It is to be understood, however, that the process is not limited to the use of aluminum chloride sludge and that other metal halide sludges may be used as starting materials as indicated hereinbefore. Referring to the accompanying drawing, the figure is a diagrammatic elevational view of apparatus suitable for carrying out my invention.

In the drawing, a hydrocarbon conversion reaction is carried out in suitable apparatus 10. The particular conditions employed and equipment used are dependent upon the conversion process as is known in the art. Being diagrammatic only, apparatus 10 of the drawing may be considered as including the reaction vessels, auxiliary equipment, etc., necessary to carry out a hydrocarbon conversion process with aluminum chloride as a catalyst and in which aluminum chloride sludge is formed. Reactants are supplied through line 12 and one or more products taken off through line 14. Aluminum chloride catalyst may be supplied through line 16 in desired form, and hydrogen chloride in catalyst-activating amounts may enter through line 18. Aluminum chloride sludge is withdrawn intermittently or continuously through line 22 and passed to a contactor 24 which contains a large body of sulfuric acid. Alternatively, orthophosphoric or other acid of phosphorus may be employed. Contactor 24 is provided with a stirring device 26 which maintains the liquid contents in an agitated condition. The sludge from line 22 may be introduced at any point, but preferably at the top of the body of acid, by means of a distributing ring or other device 28. A steam jacket 30 or other means may be used to maintain contactor 24 at an elevated temperature if desired. The sludge reacts very rapidly with the acid and substantially pure hydrogen chloride is evolved and removed continuously or intermittently through line 32. At least a portion of the hydrogen chloride is passed by line 18 to the hydrocarbon conversion 10 as catalyst activator. Any excess produced represents a valuable chemical and is recovered through line 34 for use as desired. Fresh acid in an amount sufficient to supply the quantity required for the reaction acid and that removed with products is supplied to the reactor via line 36.

Aluminum sulfate is formed in the contactor 24 as a finely divided solid. The reaction product containing the aluminum sulfate is withdrawn from the bottom of the contactor and transferred via line 38 to a hydrolyzing zone 40. The apparatus used for carrying out the hydrolysis may be substantially identical with that used for the acid reaction. The vessel in which hydrolysis is carried out may suitably be provided with a mixer 42 and water jacket 44. Water is introduced to the reactor 40 through line 46. In the hydrolyzing zone 40 higher molecular weight alcohols are formed. A limited amount of sulfonates are formed also. The alcohols formed by this hydrolysis have molecular weights lying largely within the range of 100 to 400 and are valuable for use as solvents or in other processes known to the art. It will be seen that by operating in this manner valuable products are obtained from the sludge which would otherwise not be recoverable. The reaction product from the hydrolysis is passed through line 48 to a settling tank 50. In tank 50, a non-aqueous oily layer separates from a dilute acid layer. The non-aqueous oily layer passes via lines 52 and 54 to a stripper 56.

The dilute acid layer, containing precipitated aluminium sulfate is passed to a filtration zone 60. Filtrate passes through lines 62 and 54 to the stripping zone 56. Alternatively, the total effluent or both the aqueous and non-aqueous material from the hydrolysis zone may be passed via lines 48 and 52 to the stripping zone. The stripping zone is provided with means for effecting intimate countercurrent contact of liquid and vapor. Liquid from line 54 enters near the top of the stripping zone and passes downwardly therethrough in intimate contact with steam supplied at the base thereof through line 64. In the stripping zone, water vapor and vapors of organic materials pass overhead via line 66 to a condenser 68. Condensate is collected in an accumulator 70 from which it may be taken for further separation into valuable components. From the base of the stripper, concentrated acid is passed through line 72 to an acid recovery unit 74. In the acid recovery unit sulfuric acid is separated from aluminum sulfate. This may be accomplished by any of well known means, in this specific example by concentration of the acid to effect crystallization of any aluminum sulfate present in the stripper bottoms and mechanical separation of the concentrated acid from aluminum sulfate. Sulfuric acid is taken from the recovery unit via line 76 and recycled to the acid reaction zone 24. Aluminum sulfate from the acid recovery unit goes to the filtration zone 60 where it is washed with water and filtered. Filtrate from this water wash leaves the filtration unit via line 62 with filtrate from the hydrolysis step. The filtration of material from the acid recovery step may be carried out in the filtration zone entirely separate and distinct from filtration of material fed to the filtration zone via line 58. In both cases, aluminum sulfate is filtered out, water washed and passed by a suitable conveyor to a drier 82. After drying, the aluminum sulfate product is ready for market or for further purification.

Metal halide sludge treated by the process of my invention may contain almost any proportion of metal halide. In ordinary practice when hydrocarbons are undergoing conversion, the sludge will usually contain from about 25 to about 75 per cent metal halide by weight in free and/or combined form. This sludge is reacted with sulfuric acid at any temperature between the freezing point and boiling point of the acid. Substantially atmospheric temperatures may conveniently be used. The higher temperatures effect a more complete recovery of aluminum chloride from sludge, and a temperature range of about 100 to about 400° F. is preferred, for example, in treating the sludge obtained from an aluminum chloride isomerization of normal butane, contact with 97% sulfuric acid at 150° F. effected reaction of 98% of the aluminum chloride, while contact at 200° F. under otherwise similar conditions caused the reaction of 100% of the aluminum chloride content of the sludge. Although the rate of reaction is very rapid, it is generally more convenient to provide a large excess of acid in the sludge-acid contacting zone, and to add the sludge to the acid. If the reverse procedure is used a hard crust tends to form on the surface of the body of sludge which impedes access of further amounts of acid to the sludge. It is ordinarily quite satisfactory to start the reaction with sulfuric acid of 96 to 98% concentration. The reaction may be carried out as a batch process or as a continuous process as is most expedient for a given plant. As the reaction proceeds sulfuric acid is used up in forming hydrogen chloride and aluminum sulfate, as well as in forming esters, sulfonates and the like with the organic residue of the sludge. The acid may be used successfully down to a fairly low titratable acidity. Generally I prefer to fortify the acid before it drops to a titratable acidity below about 50 per cent. The water content of the acid may increase to 15 per cent or more without effecting the reaction rate to an undesirable extent. Acid having a water content of greater than about 15 per cent is less desirable in that substantial amounts of water begin to appear in the otherwise anhydrous hydrogen halide when such acid is used. Aluminum sulfate is highly hygroscopic and tends to remove water from the reaction zone as water of crystallization. Accordingly, the using up of acid which occurs does not cause as great dilution as might otherwise be encountered. After being used a short time the sulfuric acid takes on a dark brown or blackish color, but is found to be still active for the purpose of reacting with the sludge.

The only impurity found to a substantial extent in the hydrogen chloride produced by the process of my invention is sulfur dioxide. Quantities which are ordinarily considered negligible are formed at temperatures up to 200 to 250° F. and even at 300° F. and higher. The sulfur dioxide content of the hydrogen chloride in any case seldom exceeds a few per cent, and is ordinarily well below one per cent. In some conversions the presence of minor amounts of sulfur dioxide is not objectionable; in other instances the sulfur dioxide is preferably removed from the hydrogen chloride prior to introducing the latter into the conversion system as catalyst activator. The removal may be accomplished by any suitable means, but preferably by counter-currently scrubbing the hydroben chloride gas with sulfuric acid as disclosed in my copending application, Serial Number 516,885, filed January 3, 1944, now Patent No. 2,416,011. Very minor amounts of light hydrocarbon gases, hydrogen, and carbon dioxide may also be present in the hydrogen chloride as impurities, depending upon the type of sludge treated, the strength of acid used, and reaction conditions. Such materials are oridinarily not deleterious, but may if necessary be removed in any suitable manner. Preferably when the hydrocarbon or other organic conversion in system 10 is carried out under pressure, contactor 24 is also held under pressure so that the hydrogen chloride or other hydrogen halide may be pressured to a suitable point in the conversion or separation system.

When phosphoric acid is used, similar reaction conditions are generally suitable except for the fact that a somewhat more elevated temperature is required for maintaining the reaction at a practical rate. Accordingly, when using ortho-phosphoric acid, an operating temperature of 130° F. or higher is preferred. In the hydrolysis step, when phosphoric acid is used, lower yields of alcohols are obtained than when sulfuric acid is used. Aluminum phosphate, of course, constitutes the inorganic product obtained.

Throughout this specification and in the accompanying claims, the term "relatively non-volatile strong mineral acid" is used to denote sulfuric acid or an oxygen containing acid of phosphorus, especially phosphoric acid, and to exclude all other acids.

The following data are offered to show results obtainable in the practice of my invention as applied to certain conversion processes. Inasmuch as many other applications will be evident to one skilled in the art it is to be understood that the examples are merely illustrative and are not to be construed as unduly limiting the scope of the invention.

Example 1

A plant in which isobutane is alkylated with ethylene produces 66,000 gallons per day of 7 pound Reid vapor pressure alkylate predominating in diisopropyl. A sludge-type aluminum chloride catalyst activated with hydrogen chloride is used. The fresh sludge is made up from powdered commercial aluminum chloride and heavy alkylate. This sludge catalyst is added to the system as required to maintain optimum catalytic activity. Sludge is withdrawn from the catalyst stream at the rate of 5000 pounds per day, and has an average aluminum chloride content of about 55% by weight. This sludge is reacted with 5,500 pounds of sulfuric acid in a contactor similar to that shown in the drawing. The contactor is held at 175° F. and the acid maintained at a titratable acidity of 80%. Hydrogen chloride is produced at the rate of 3900 pounds per day, and is purified by a countercurrent scrubbing with commercial sulfuric acid. Acid from this scrubbing is used as make-up acid to the sludge reaction. Two thousand pounds per day of the hydrogen chloride is used as make-up activator in the diisopropyl plant, and the remainder comprises pure hydrogen chloride which is valuable for use in other processes. After hydrolysis, the aluminum sulfate is separated by filtration. About 6000 pounds of aluminum sulfate per day is recovered. Additionally about 4000 pounds per day of mixed organic compounds is obtained as a by-product.

Example II

When phosphoric acid is used to treat the sludge from the diisopropyl plant of Example I, 3650 pounds of phosphoric acid per day is required with the production of 4600 pounds aluminum phosphate per day.

I claim:

1. A process for the production of valuable products from a Friedel-Crafts type metal halide-hydrocarbon sludge, spent as a catalyst in an organic reaction, which comprises reacting said sludge with a relatively non-volatile strong mineral acid with the formation of hydrogen halide, separating the hydrogen halide from the resulting reaction mixture, admixing the remaining reaction mixture with water in a hydrolysis step and hydrolyzing organic constituents thereof to form substantial quantities of alcohols, subjecting the effluent of said hydrolysis step to settling with the formation of a non-aqueous layer containing said alcohols and an aqueous layer containing the salt of the metal from said metal halide and said strong mineral acid, withdrawing the non-aqueous layer from the settling step and subjecting same to vaporization effecting recovery of said alcohols therefrom, separating said salt from said aqueous layer, subjecting the remainder of said aqueous layer to vaporization effecting separation of said strong mineral acid therefrom as an unvaporized residue, and returning said recovered acid to the acid reaction step.

2. The process of claim 1, in which said metal halide is aluminum chloride.

3. The process of claim 1, in which said non-volatile strong mineral acid is sulfuric acid.

4. The process of claim 1, in which said non-volatile strong mineral acid is an oxygen-containing acid of phosphorus.

5. The process of claim 1, in which said non-volatile strong mineral acid is phosphoric acid.

6. A process for the production of valuable products from an aluminum chloride-hydrocarbon sludge, spent as a catalyst in an organic reaction containing from about 25 to about 75 per cent aluminum chloride together with free and combined hydrocarbons, which comprises continuously contacting said sludge with a large body of a relatively non-volatile strong mineral acid having a titrable acidity of at least 50 per cent in a reaction zone under conditions such that the aluminum chloride content of said sludge is substantially completely converted to the aluminum salt of said strong mineral acid with the formation of hydrogen chloride, separating the hydrogen chloride from the resulting reaction mixture, contacting the remaining effluent of said reaction zone with water in a hydrolysis zone and hydrolyzing organic constituents thereof including esters and sulfonates to form substantial quantities of alcohols having molecular weights within the range of 100 to 400, passing the effluent of said hydrolysis zone to a settling zone wherein said effluent is separated into a non-aqueous layer and an aqueous layer containing the aluminum salt of said acid, passing the non-aqueous layer from said settling zone to a stripping zone wherein hydrocarbons and derivatives thereof including alcohols are recovered by stripping with steam, passing the aqueous layer from said settling zone to a separation zone wherein said aluminum salt is separated from the aqueous layer, passing the remainder of said aqueous layer to a vaporization zone, vaporizing water and any hydrocarbons and derivatives thereof from said aqueous layer in the vaporization zone leaving a residuum comprising said acid, and returning said acid residuum to said reaction zone.

7. The process of claim 6, in which said non-volatile strong mineral acid is sulfuric acid.

8. A process for the production of valuable products from a Friedel-Crafts type metal halide-hydrocarbon sludge, spent as a catalyst in an organic reaction which comprises reacting said sludge with a relatively non-volatile strong mineral acid with the formation of hydrogen halide, separating the hydrogen halide from the resulting reaction mixture, admixing the remaining reaction mixture with water in a hydrolysis step and hydrolyzing organic constituents thereof to form substantial quantities of alcohols having molecular weights within the range of 100 to 400, subjecting the effluent of said hydrolysis step to settling with the formation of a non-aqueous layer containing said alcohols and an aqueous layer containing the salt of the metal from said metal halide and said strong mineral acid, withdrawing the non-aqueous layer from the settling step and subjecting same to vaporization effecting recovery of said alcohols therefrom, separating said salt from said aqueous layer, subjecting the remainder of said aqueous layer to vaporization effecting separation of water and any hydrocarbons and derivatives thereof as vapor and leaving a residuum comprising said strong mineral acid having suspended therein the salt of the metal from said metal halide and said strong mineral acid, separating said salt from suspension in said acid, and returning said recovered acid to the acid reaction step.

9. The process of claim 8, in which said non-volatile strong mineral acid is sulfuric acid.

10. A process for the production of valuable products from an aluminum chloride-hydrocarbon sludge, spent as a catalyst in an organic reaction, which comprises reacting said sludge with concentrated sulfuric acid having a titratable acidity of at least 50% with the formation of hydrogen chloride, separating hydrogen chloride from the remaining reaction mixture, admixing the latter with water in a hydrolysis step and hydrolyzing organic constituents thereof to form substantial quantities of alcohols having molecular weights within the range of 100 to 400, subjecting the effluent of said hydrolysis step to settling with the formation of a non-aqueous layer containing said alcohols and an aqueous layer containing sulfuric acid and having suspended therein aluminum sulfate, withdrawing said aqueous layer from the settling step and subjecting same to filtration to recover solid aluminum sulfate therefrom, passing the resulting filtrate into a stripping zone, withdrawing the non-aqueous layer from the settling step and passing same to said stripping zone, subjecting the combined filtrate and non-aqueous layer in said stripping zone to stripping with steam, recovering from said stripping step any hydrocarbons and derivatives thereof including said alcohols, recovering as a residuum from said stripping step concentrated sulfuric acid containing aluminum sulfate, crystallizing and separating aluminum sulfate from said sulfuric acid, and returning the thus recovered acid to the acid reaction step.

11. The process of claim 10 in which said residuum is subjected to partial settling to recover sulfuric acid substantially free from suspended aluminum sulfate which acid is returned to said acid reaction step and a mixture of solid aluminum sulfate with acid, said mixture is subjected to filtration to recover aluminum sulfate therefrom, and the aluminum sulfate so recovered and the aluminum sulfate filtered from the aqueous layer is washed and dried to form a resulting aluminum sulfate product of the process.

JOHN W. LATCHUM, JR.

REFERENCES CITED

The following references are of record in the file of this patent:

UNITED STATES PATENTS

| Number | Name | Date |
|---|---|---|
| 1,277,329 | McAfee | Aug. 27, 1918 |
| 1,579,607 | Halloran | Apr. 6, 1926 |
| 1,986,091 | Wood | Jan. 1, 1935 |
| 1,999,621 | Van Peski | Apr. 30, 1935 |
| 2,139,394 | Van Peski | Dec. 6, 1938 |
| 2,287,732 | Frey et al. | June 23, 1942 |
| 2,308,219 | Vesterdal et al. | Jan. 12, 1943 |
| 2,326,505 | Tulleners | Aug. 10, 1943 |
| 2,330,077 | O'Dell | Sept. 21, 1943 |
| 2,365,917 | Thomas | Dec. 26, 1944 |
| 2,375,321 | Nysewander et al. | May 8, 1945 |

OTHER REFERENCES

Babor et al., "General College Chemistry," Crowell Co., N. Y., 1940, page 319.